United States Patent
Sugawa et al.

(10) Patent No.: US 9,391,734 B2
(45) Date of Patent: Jul. 12, 2016

(54) NETWORK SYSTEM

(71) Applicant: HITACHI, LTD., Tokyo (JP)

(72) Inventors: Jun Sugawa, Tokyo (JP); Toshiyuki Odaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1 day.

(21) Appl. No.: 14/448,097

(22) Filed: Jul. 31, 2014

(65) Prior Publication Data
US 2015/0037035 A1 Feb. 5, 2015

(30) Foreign Application Priority Data

Aug. 2, 2013 (JP) .................................. 2013-161443

(51) Int. Cl.
*H04J 14/02* (2006.01)
*H04J 14/08* (2006.01)
(52) U.S. Cl.
CPC ............... *H04J 14/08* (2013.01); *H04J 14/025* (2013.01); *H04J 14/0226* (2013.01); *H04J 14/0238* (2013.01); *H04J 14/0282* (2013.01)
(58) Field of Classification Search
CPC ..................... H04J 14/0246; H04J 14/025
See application file for complete search history.

(56) References Cited

U.S. PATENT DOCUMENTS

| | | | | |
|---|---|---|---|---|
| 2014/0161456 | A1* | 6/2014 | Sugawa | H04J 14/0227 398/72 |
| 2014/0233944 | A1* | 8/2014 | Vetter | H04J 14/025 398/34 |
| 2015/0023664 | A1* | 1/2015 | Mukai | H04J 4/0242 398/58 |
| 2015/0229430 | A1* | 8/2015 | Liang | H04J 14/0242 398/68 |
| 2015/0229431 | A1* | 8/2015 | Sugawa | H04J 14/0232 398/72 |

FOREIGN PATENT DOCUMENTS

JP 2006-081014 A 3/2006

* cited by examiner

*Primary Examiner* — Nathan Curs
(74) *Attorney, Agent, or Firm* — Mattingly & Malur, PC

(57) ABSTRACT

Provided is a network system including a subscriber apparatus and a station-side apparatus connected with the subscriber apparatus via an optical line. The subscriber apparatus includes a transceiver for receiving an instruction to change wavelengths for signals to be sent and received, receiving a downstream signal sent from the station-side apparatus and having a wavelength designated by the instruction, and sending an upstream signal having a wavelength designated by the instruction to the station-side apparatus. The subscriber apparatus includes a controller for identifying at least one property of the received downstream signal and determining wavelengths for signals to be sent and received based on the identified at least one property.

14 Claims, 9 Drawing Sheets

NETWORK SYSTEM

CLAIM OF PRIORITY

The present application claims priority from Japanese patent application JP2013-161443 filed on Aug. 2, 2013, the content of which is hereby incorporated by reference into this application.

BACKGROUND

This invention relates to a network system. The recent prevalence of the Internet is enhancing the demand for higher-speed network communications. To meet this demand for higher-speed communications, ADSL (Asymmetric Digital Subscriber Line) or PON (Passive Optical Network) is growing. The PON includes B-PON (Broadband PON), E-PON (Ethernet PON), and G-PON (Gigabit-capable PON).

The PON is a network system which connects an accommodation station (OLT: Optical Line Terminal) installed in a vendor's station and network units (ONUs: Optical Network Units) installed in user premises; in the PON, the signal in an optical fiber connected to the OLT is split into a plurality of fibers with an optical splitter; the plurality of fibers are connected to the ONUs one by one. When a network is configured with the PON, low cost fiber installation and high-speed communications by employment of optical transmission are attained. For these reasons, the PON is spreading all over the world.

Among the techniques utilizing the PON, TDM-PON (Time Division Multiplexing Passive Optical Network) is widely employed, which uses optical signals having different wavelengths in downstream transmission from the OLT to ONUs and upstream transmission from the ONUs to the OLT and further applies time-division multiplexing to the signals depending on the ONU. This TDM-PON is employed in B-PON, E-PON, G-PON, 10G-EPON, and XG-PON.

In the TDM-PON, the OLT controls the timing of sending optical signals from ONUs to prevent a conflict among the optical signals from the ONUs in upstream transmission. Specifically, the OLT sends each ONU a control frame to specify a permitted transmission period. Each ONU sends an upstream control signal and upstream data during the period specified by the received control frame.

Other than the PON, the point-to-point type for communicating one to one is widely used for an optical access network. As a standard for the physical layer and the MAC layer in the point-to-point type network, 1000BASE-LX may be employed.

Traditionally, optical access networks of different standards have been used for different accommodated services and different communication carriers, so that optical fiber networks specific to the individual optical access methods have been constructed. For this reason, the use of a plurality of optical access methods have elevated the cost for apparatuses, the cost to construct optical fiber networks, and the cost for their maintenance and management.

Accordingly, desired is an optical access network that accommodates optical signals generated by various optical access methods into the same optical fiber network by wavelength-division multiplexing. In order to efficiently use multiple wavelength patterns as resources, it is desirable that the optical access network should not to fix the association relations between wavelengths and optical access methods but flexibly configure them depending on the optical access.

Because of a massive number of ONUs, manual configuration of wavelengths in ONUs complicates management; furthermore, some mistake in the configuration might cause malfunctions. Accordingly, demanded for the future are optical access networks that attain co-existence of various optical access methods, flexible configuration of access methods and wavelengths, and automatic wavelength configuration for individual ONUs.

There have been proposed wavelength-division multiplexing optical access systems that can flexibly configure the connection of OSUs and ONUs in order to accommodate various services (for example, refer to JP 2006-081014 A). JP 2006-081014 A discloses a technique that an OSU in an OLT superimposes a frequency tone on downstream signal light in transmission and each ONU sets a wavelength based on the frequency tone.

SUMMARY

The technique disclosed in JP 2006-081014 A provides a control channel (frequency tone) in addition to the main signal between an OLT and an ONU; accordingly, the OLT needs an additional circuit to superimpose a frequency tone for transmission and the ONU needs an additional circuit to separate and detect the frequency tone.

To set a wavelength to an ONU, the OLT and the ONU need modification and in addition, configuration to make correspondence of the frequency tone for the control channel between the OSU and the ONU. For this reason, the ONU needs to be configured with the frequency appropriately for the OSU at the installation, which complicates the management of ONUs.

This invention has been accomplished in view of these problems and an object of this invention is to provide, in a wavelength-division multiplexing optical access network inclusive of a plurality of services and a plurality of optical access methods (protocols), a system in which each ONU by itself can set a wavelength conformable to the service and protocol to be used by the ONU without using a control channel.

A representative example of this invention is a network system including a subscriber apparatus and a station-side apparatus connected with the subscriber apparatus via an optical line. The subscriber apparatus includes a transceiver for receiving an instruction to change wavelengths for signals to be sent and received, receiving a downstream signal sent from the station-side apparatus and having a wavelength designated by the instruction, and sending an upstream signal having a wavelength designated by the instruction to the station-side apparatus. The subscriber apparatus includes a controller for identifying at least one property of the received downstream signal and determining wavelengths for signals to be sent and received based on the identified at least one property.

According to an embodiment of this invention, each ONU sets a wavelength conformable to a protocol and other purposes to the ONU by itself, so that the cost for system construction can be reduced.

Objects, configurations, and effects of this invention other than those described above will be clarified in the description of the following embodiments.

DETAILED DESCRIPTION OF THE EMBODIMENTS

Hereinafter, embodiments of this invention will be described in detail with reference to the drawings. The elements common to the drawings are assigned the same reference signs.

Embodiment 1

Figure 1:
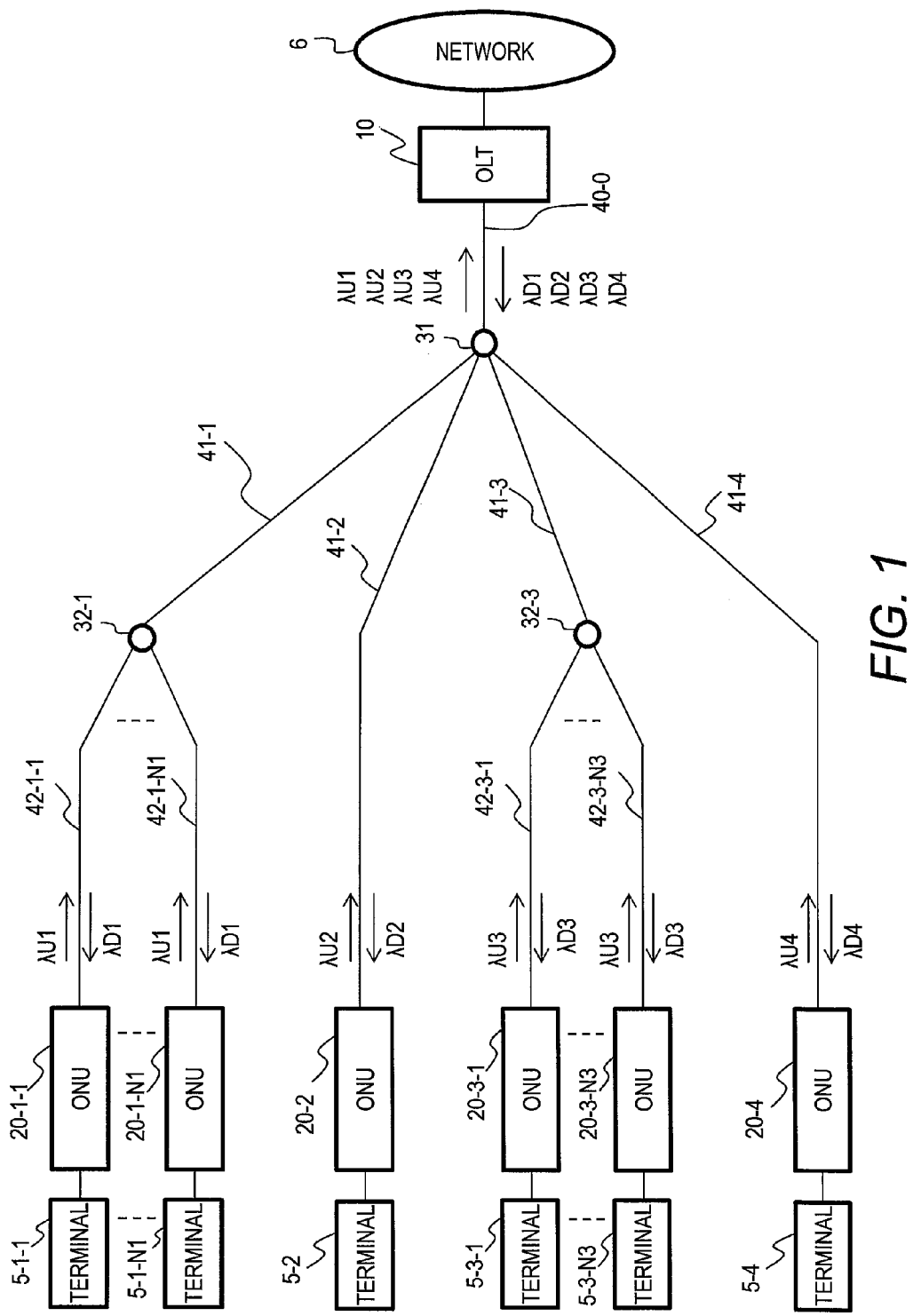
FIG. 1 is a block diagram illustrating an optical access network in Embodiment 1.

FIG. 1 is a block diagram illustrating an optical access network in Embodiment 1.

The optical access network in Embodiment 1 includes an OLT 10, an optical splitter 31, a plurality of optical splitters 32 (32-1, 32-2), a plurality of ONUs 20 (20-1-1 to 20-1-N1, 20-2, 20-3-1 to 20-3-N3, and 20-4: N1 and N3 are any positive numbers), and a plurality of terminals 5 (5-1-1 to 5-1-N1, 5-2, 5-3-1 to 5-3-N3, and 5-4). The OLT 10 is an optical line terminal and the ONUs 20 are optical network units.

The OLT 10 and the plurality of ONUs 20 are connected with an optical fiber 40-0, a plurality of first branch fibers 41 (41-1 to 41-4), and a plurality of second branch fibers 42 (42-1-1 to 42-1-N1, 42-3-1 to 42-3-N3). The optical fiber 40-0 is a trunk line and connects the OLT 10 and the optical splitter 31.

The first branch fiber 41-1 connects the optical splitter 31 and the optical splitter 32-1; the first branch fiber 41-3 connects the optical splitter 31 and the optical splitter 32-3. The first branch fiber 41-2 connects the optical splitter 31 and the ONU 20-2 and the first branch fiber 41-4 connects the optical splitter 31 and the ONU 20-4.

The second branch fibers 42-1 (42-1-1 to 42-1-N1) connect the optical splitter 32-1 and the ONUs 20-1-1 to ONU 20-1-N1 and the second branch fibers 42-3 (42-3-1 to 42-3-N3) connect the optical splitter 32-3 and the ONUs 20-3-1 to ONU 20-3-N3.

The terminals 5-1-1 to 5-1-N1, the terminal 5-2, the terminals 5-3-1 to 5-3-N3, and the terminal 5-4 are connected with the ONU 20-1-1 to ONU 20-1-N1, the ONU 20-2, the ONU 20-3-1 to 20-3-N3, and the ONU 20-4, respectively.

The protocols used by the ONUs 20 to communicate with the OLT 10 and the services provided in communications between the ONUs 20 and the OLT 10 in this embodiment are described as follows. A protocol in this embodiment means a method to transmit an optical signal, or an optical access method. A service in this embodiment means a service for guaranteeing a predetermined communication quality.

The ONUs 20-1-1 to 20-1-N1 are ONUs 20 used to provide Service A and employ a protocol of 10G-EPON. The ONU 20-2 is an ONU 20 used to provide Service B and employs a protocol of 10G-P2P.

The ONUs 20-3-1 to 20-3-N3 are ONUs 20 used to provide Service C and employ a protocol of 1G-EPON. The ONU 20-4 is an ONU 20 used to provide Service D and employs a protocol of 1G-P2P.

Next, the downstream wavelengths used in downstream optical transmission from the OLT 10 to the ONUs 20 and the upstream wavelengths used in upstream optical transmission from the ONUs 20 to the OLT 10 are described as follows. The ONUs 20-1-1 to 20-1-N1 communicate with the OLT 10 using signals having a downstream wavelength $\lambda D1$ and an upstream wavelength $\lambda U1$. The ONU 20-2 communicates with the OLT 10 using signals having a downstream wavelength $\lambda D2$ and an upstream wavelength $\lambda U2$.

The ONUs 20-3-1 to 20-3-N3 communicate with the OLT 10 using signals having a downstream wavelength $\lambda D3$ and an upstream wavelength $\lambda U3$. The ONU 20-4 communicates with the OLT 10 using signals having a downstream wavelength $\lambda D4$ and an upstream wavelength $\lambda U4$.

It should be noted that the foregoing wavelengths are merely examples; the wavelength for upstream transmission and the wavelength for downstream transmission used by each ONU 20 in the optical access network of this embodiment do not need to be fixed to one value but may be determined dynamically.

Next, downstream optical transmission is described. The OLT 10 generates a wavelength-division multiplex optical signal of optical signals having downstream wavelengths $\lambda D1$, $\lambda D2$, $\lambda D3$, and $\lambda D4$ to send optical signals to the ONUs 20. The OLT 10 sends the wavelength-division multiplex optical signal to the ONUs 20 via the optical fiber 40, the optical splitter 31, the first branch fibers 41, and so on.

Each ONU 20 has a wavelength-tunable optical transceiver that can select wavelengths for transmission and reception (which will be described later), and can send and receive signals having specified wavelengths with the wavelength-tunable optical transceiver.

Specifically, when an ONU 20 receives a wavelength-division multiplex downstream optical signal, it selects and receives only an optical signal having a specified wavelength out of the received downstream optical signal.

For example, the ONUs 20-1-1 to 20-1-N1 select only a signal having the downstream wavelength $\lambda D1$ from a wavelength-division multiplex downstream optical signal to receive the selected signal. The ONU 20-2 selects only a signal having the downstream wavelength $\lambda D2$ from a wavelength-division multiplex downstream optical signal to receive the selected signal. The ONUs 20-3-1 to 20-3-N3 select only a signal having the downstream wavelength $\lambda D3$ from a wavelength-division multiplex downstream optical signal to receive the selected signal. The ONU 20-4 selects only a signal having the downstream wavelength $\lambda D4$ from a wavelength-division multiplex downstream optical signal to receive the selected signal.

The ONUs 20-1-1 to 20-1-N1 employing 10G-EPON and the ONUs 20-3-1 to 20-3-N3 employing 1G-EPON receive time-division multiplex downstream optical signals including MAC frames for the individual ONUs 20. For example, the downstream optical signal having the downstream wavelength $\lambda D1$ includes time-division multiplexed optical signals for the ONUs 20-1-1 to 20-1-N1; each of the ONUs 20-1 analyzes each frame received from the OLT 10 to determine whether the frame is addressed to itself, and selects and receives only the frames addressed to itself.

The ONU 20-2 employing 10G-P2P and the ONU 20-4 employing 1G-P2P receive downstream optical signals including MAC frames addressed only to themselves. This is because, in the case of using P2P, the OLT 10 corresponds to an ONU 20 one to one with respect to a specified downstream wavelength.

For example, a downstream optical signal having the downstream wavelength λD2 includes only a signal for the ONU 20-2. Hence, the ONU 20-2 receives all downstream optical signals having the downstream wavelength λD2 as the frames addressed to itself.

Next, upstream transmission is described. Each ONU 20 selects one of the upstream wavelengths λU1 to λU4 and sends an upstream optical signal having the selected wavelength. The ONUs employing point-to-multipoint protocols (such as EPON) send upstream burst optical signals within a period specified by the OLT 10. The ONUs employing point-to-point protocols (such as P2P) send continuous upstream optical signals.

Specifically, the ONUs 20-1-1 to 20-1-N1 send upstream burst signals having the upstream wavelength λU1; the ONU 20-2 sends a continuous optical signal having the upstream wavelength λU2; the ONUs 20-3-1 to 20-3-N3 send upstream burst signals having the upstream wavelength λU3; and the ONU 20-4 sends a continuous optical signal having the upstream wavelength λU4.

The upstream optical signals sent from the ONUs 20 are multiplexed by the optical splitter 31, 32-1, or 32-3 and fed to the OLT 10. Accordingly, the OLT 10 receives an upstream optical signal obtained by time-division multiplexing and wavelength-division multiplexing upstream optical signals having upstream wavelengths λU1 to λU4.

In this way, the optical access network in Embodiment 1 accommodates a plurality of TDM-PONs and a plurality of point-to-multipoint networks with a plurality of wavelengths, so that it can provide various services. In this description, the wavelengths used by the four ONU 20 groups shown in FIG. 1 are associated with all different protocols by way of example; however, a plurality of wavelengths may be associated with one protocol.

Figure 2:
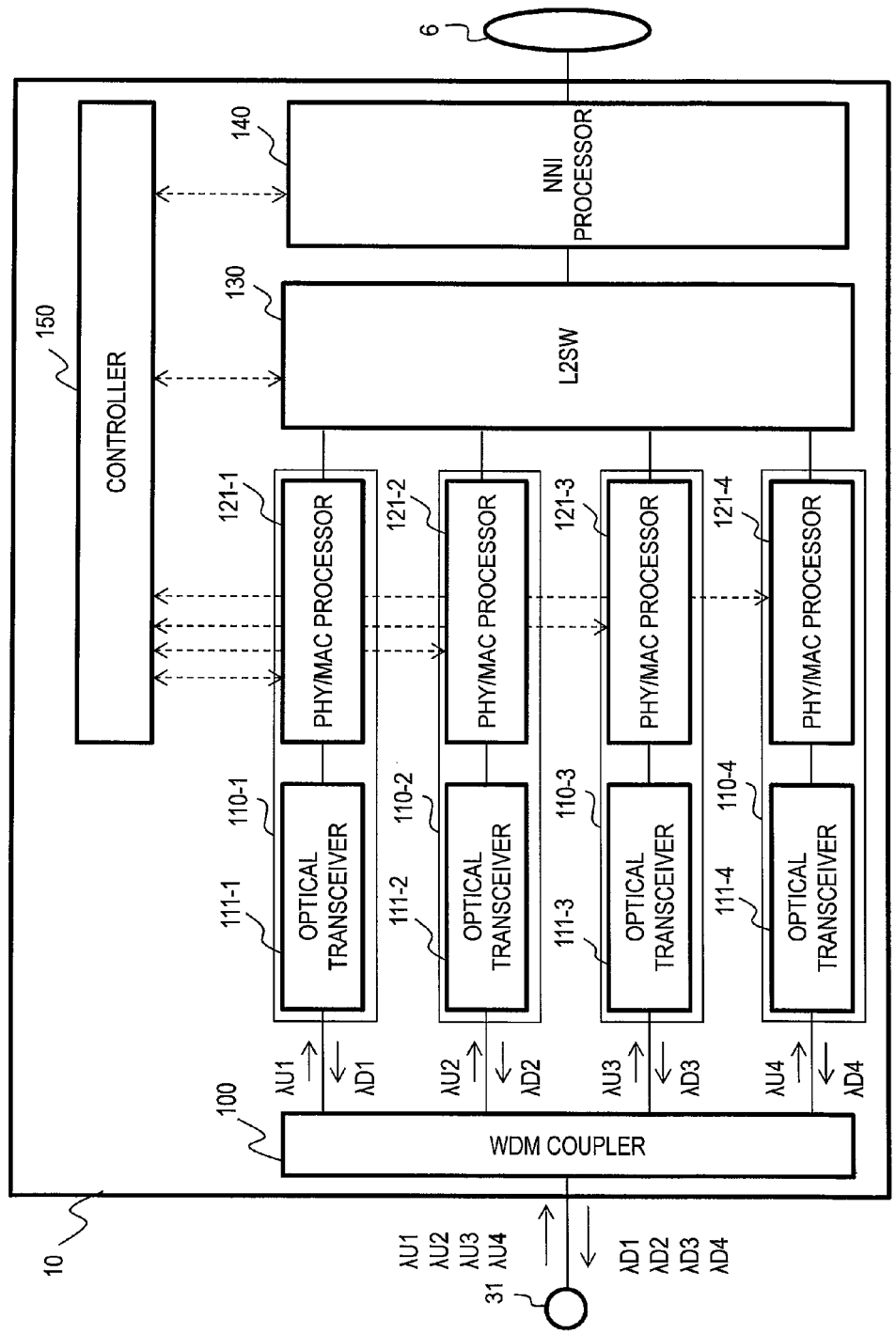
FIG. 2 is a block diagram illustrating a configuration of an OLT in Embodiment 1.

FIG. 2 is a block diagram illustrating a configuration of the OLT 10 in Embodiment 1.

The OLT 10 includes a WDM coupler (Wavelength Division Multiplexing coupler) 100, a plurality of OSUs 110 (OSUs 110-1 to 110-4), an L2SW (Layer 2 switch) 130, an NNI processor 140, and a controller 150.

The WDM coupler 100 demultiplexes an upstream optical signal fed from the optical splitter 31 into optical signals having upstream wavelengths λU1 to λU4. The WDM coupler 100 also multiplexes downstream optical signals having downstream wavelengths λD1 to λD4 fed from the OSUs 110 into a downstream optical signal.

The WDM coupler 100 feeds the upstream optical signal having the upstream wavelength λU1 to the optical transceiver 111-1, the upstream optical signal having the upstream wavelength λU2 to the optical transceiver 111-2, the upstream optical signal having the upstream wavelength λU3 to the optical transceiver 111-3, and the upstream optical signal having the upstream wavelength λU4 to the optical transceiver 111-4.

The WDM coupler 100 also multiplexes the downstream optical signal having the downstream wavelength λD1 fed from the optical transceiver 111-1, the downstream optical signal having the downstream wavelength λD2 fed from the optical transceiver 111-2, the downstream optical signal having the downstream wavelength λD3 fed from the optical transceiver 111-3, and the downstream optical signal having the downstream wavelength of λD4 fed from the optical transceiver 111-4 into one downstream optical signal. Then, the WDM 100 feeds the multiplex downstream optical signal to the optical fiber 40-0.

The OSUs 110 are processing units to perform signal processing different by wavelength. Each OSU 110 includes an optical transceiver 111 (111-1, 111-2, 111-3, or 111-4) and a PHY/MAC processor 121 (121-1, 121-2, 121-3, or 121-4).

The OSU 110-1 performs processing for optical signals having the upstream wavelength λU1 and the downstream wavelength λD1. The OSU 110-2 performs processing for optical signals having the upstream wavelength λU2 and the downstream wavelength λD2. The OSU 110-3 performs processing for optical signals having the upstream wavelength λU3 and the downstream wavelength λD3. The OSU 110-4 performs processing for optical signals having the upstream wavelength λU4 and the downstream wavelength λD4.

Each of the optical transceivers 111 receives an upstream optical signal fed by the WDM coupler 100 and converts the received upstream optical signal into an electric current signal. Furthermore, each optical transceiver 111 converts the obtained current signal into a voltage signal, amplifies it, and feeds the converted and amplified electric signal to the PHY/MAC processor 121.

Each of the optical transceivers 111 also converts an electric signal fed by the PHY/MAC processor 121-1, 121-2, 121-3, or 121-4 into an optical signal having one of the downstream wavelengths λD1 to λD4, and feeds the obtained optical signal to the WDM coupler 100.

Each of the PHY/MAC processors 121-1 to 121-4 performs physical layer processing and MAC layer processing conformable to the protocol (optical access control) used by the OSU 110 on the electric signal. Specifically, the PHY/MAC processor 121-1 performs physical layer processing and MAC layer processing conformable to the standard of 10G-EPON; the PHY/MAC processor 121-2 performs physical layer processing and MAC layer processing conformable to the standard of 10G-P2P (10-gigabit Ethernet); the PHY/MAC processor 121-3 performs physical layer processing and MAC layer processing conformable to the standard of 1G-EPON; and the PHY/MAC processor 121-4 performs physical layer processing and MAC layer processing consistent with the standard of 1G-P2P (Gigabit Ethernet).

Hereinafter, processing in each PHY/MAC processor 121 in accordance with the specifications of the protocol will be described.

The PHY/MAC processor 121-1 extracts a clock from a 10.3125-Gbps electric signal fed by the optical transceiver 111-1 and retimes the electric signal with the extracted clock to convert the electric signal to a digital signal. The PHY/MAC processor 121-1 then performs 64B/66B decoding and decoding of an error correction code RS (255, 223) on the digital signal.

Furthermore, the PHY/MAC processor 121-1 extracts a MAC frame from the decoded digital signal and analyzes the header of the extracted MAC frame. The PHY/MAC processor 121-1 separates the MAC frame into a control frame and a data frame based on the result of the header analysis.

The PHY/MAC processor 121-1 analyzes the control frame and performs processing appropriate for the control frame. Meanwhile, the PHY/MAC processor 121-1 transfers the separate data frame to the L2SW 130.

The PHY/MAC processor 121-1 also analyzes the header of a data frame fed by the L2SW 130 and determines the destination ONU 20 to forward the data frame based on the analysis result. Then, the PHY/MAC processor 121-1 attaches an LLID (Logical Link Identifier) assigned to the destination ONU 20 to the data frame to create a 10G-EPON data frame.

The PHY/MAC processor 121-1 also creates a 10G-EPON MPCP control frame and multiplexes the created 10G-EPON data frame and MPCP control frame. Further, the PHY/MAC processor 121-1 performs 64B/66B encoding and FEC encoding on the obtained multiplex frame, further converts the digital signal of the frame into an electric signal, and feeds it to the optical transceiver 111-1.

The PHY/MAC processor 121-2 extracts a clock from a 10.3125-Gbps electric signal fed by the optical transceiver 111-2 and retimes the electric signal with the extracted clock to convert the electric signal to a digital signal. The PHY/MAC processor 121-2 then performs 64B/66B decoding on the digital signal.

Furthermore, the PHY/MAC processor 121-2 extracts a MAC frame from the decoded digital signal and analyzes the header of the extracted MAC frame. The PHY/MAC processor 121-2 separates the MAC frame into a data frame and a control frame based on the result of the header analysis.

The PHY/MAC processor 121-2 analyzes the control frame and performs processing appropriate for the control frame. Meanwhile, the PHY/MAC processor 121-2 transfers the separate data frame to the L2SW 130.

In the case of receipt of a data frame fed by the L2SW 130 as a 10G-P2P frame, the PHY/MAC processor 121-2 creates an OAM control frame and multiplexes the received data frame and the created control frame. Further, the PHY/MAC processor 121-2 performs 64B/66B encoding on the obtained multiplex frame and converts the digital signal of the frame into an electric signal. Then, it feeds the frame that has been converted into an electric signal to the optical transceiver 111-2.

The PHY/MAC processor 121-3 extracts a clock from a 1.25-Gbps electric signal fed by the optical transceiver 111-3 and retimes the electric signal with the extracted clock to convert the electric signal to a digital signal. The PHY/MAC processor 121-3 then performs 8B/10B decoding on the digital signal obtained by the conversion.

Furthermore, the PHY/MAC processor 121-3 extracts a MAC frame from the decoded digital signal and analyzes the header of the extracted MAC frame. The PHY/MAC processor 121-3 separates the MAC frame into a control frame and a data frame based on the result of the header analysis.

The PHY/MAC processor 121-3 analyzes the control frame and performs processing appropriate for the control frame. Meanwhile, the PHY/MAC processor 121-3 transfers the separate data frame to the L2SW 130.

The PHY/MAC processor 121-3 also analyzes the header of a data frame fed by the L2SW 130 and determines the destination ONU 20 to forward the data frame based on the analysis result. Then, the PHY/MAC processor 121-3 attaches an LLID assigned to the destination ONU 20 to the data frame to create a 1G-EPON data frame.

The PHY/MAC processor 121-3 creates a 1G-EPON MPCP control frame and multiplexes the created 1G-EPON data frame and the MPCP control frame. Further, the PHY/MAC processor 121-3 performs 8B/10B encoding on the obtained multiplex frame. The PHY/MAC processor 121-3 then converts the digital signal of the encoded frame into an electric signal and feeds it to the optical transceiver 111-3.

The PHY/MAC processor 121-4 extracts a clock from a 1.25-Gbps electric signal fed by the optical transceiver 111-4 and retimes the electric signal with the extracted clock to convert the electric signal to a digital signal. The PHY/MAC processor 121-4 then performs 8B/10B decoding on the digital signal.

Furthermore, the PHY/MAC processor 121-4 extracts a MAC frame from the decoded digital signal and analyzes the header of the extracted MAC frame. The PHY/MAC processor 121-4 separates the MAC frame into a control frame and a data frame based on the result of the header analysis.

The PHY/MAC processor 121-4 analyzes the control frame and performs processing appropriate for the control frame. Meanwhile, the PHY/MAC processor 121-4 transfers the separate data frames to the L2SW 130.

In the case of receipt a data frame fed by the L2SW 130 as a 1G-P2P frame, the PHY/MAC processor 121-4 creates a control frame for OAM and multiplexes the received data frame and the created control frame. Further, the PHY/MAC processor 121-4 performs 8B/10B encoding on the obtained multiplex frame, converts the digital signal into an electric signal, and feeds it to the optical transceiver 111-4.

The L2SW 130 multiplexes a plurality of MAC frames fed by the PHY/MAC processors 121-1 to 121-4 to create one frame and transfers the created frame to the NNI processor 140 as a user data frame. Also, the L2SW 130 outputs MAC frames fed by the NNI processor 140 toward the OSUs 110 in accordance with the addresses designated by the MAC frames via ports each connected with an OSU 110.

The NNI processor 140 converts a user data frame received from the L2SW 130 into a signal conformable to the NNI (Network Node Interface). The NNI processor 140 then feeds the converted user data frame to the network 6. The NNI processor 140 also transfers a user data frame fed from the network 6 to the L2SW 130.

The configuration of the OLT 10 in Embodiment 1 allows the single OLT 10 to accommodate communications from ONUs 20 using a plurality of different protocols (optical access standards).

Figure 3:
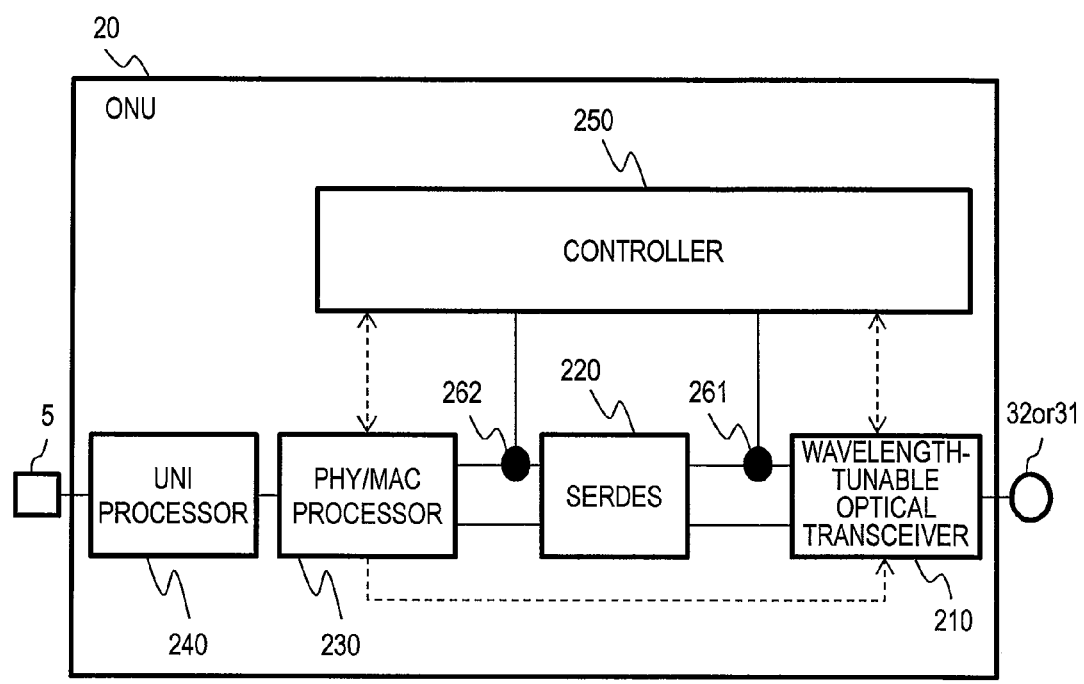
FIG. 3 is a block diagram illustrating a configuration of an ONU in Embodiment 1.

FIG. 3 is a block diagram illustrating a configuration of an ONU 20 in Embodiment 1.

The ONU 20 includes a wavelength-tunable optical transceiver 210, a SerDes (Serializer/Deserializer) 220, a PHY/MAC processor 230, a UNI processor 240, a controller 250, and distributors 261 and 262.

The wavelength-tunable optical transceiver 210 is an optical transceiver that can tune the wavelength for transmission (upstream wavelength) of the ONU 20 and the wavelength for reception (downstream wavelength) of the ONU 20. The wavelength-tunable optical transceiver 210 receives an instruction to set a wavelength for transmission and a wavelength for reception from the controller 250. The wavelength-tunable optical transceiver 210 sets the wavelength to transmit upstream optical signals at one of the upstream wavelengths $\lambda U1$ to $\lambda U4$ in accordance with the instruction and sends upstream signals toward the OLT 10.

The wavelength-tunable optical transceiver 210 receives downstream optical signals having the downstream wavelength designated by the controller 250 (one of the downstream wavelengths $\lambda D1$ to $\lambda D4$). The wavelength-tunable optical transceiver 210 can switch the output of its own optical transmitter (laser) between ON and OFF in accordance with an instruction from the controller 250 or the PHY/MAC processor 230.

Now, operations of the wavelength-tunable optical transceiver 210 are described, assuming that the wavelength for transmission is set at the upstream wavelength $\lambda U1$ and the wavelength for reception is set at the downstream wavelength $\lambda D1$. In the case where the downstream optical signal sent from the OLT 10 is a downstream optical signal obtained by wavelength-division multiplexing the downstream wavelengths λD1 to λD4, the wavelength-tunable optical transceiver 210 does not receive the signals having wavelengths other than the downstream wavelength λD1 from the downstream optical signal.

The wavelength-tunable optical transceiver 210 selects only the downstream optical signal having the downstream wavelength λD1 to receive the selected downstream optical signal. The wavelength-tunable optical transceiver 210 may include an optical filter in which the wavelength to pass through is tunable to perform such an operation.

The wavelength-tunable optical transceiver 210 converts the downstream optical signal having the downstream wavelength λD1 into an electric current signal, converts the electric current signal into a voltage signal, and then amplifies the voltage signal to generate an electric signal. The wavelength-tunable optical transceiver 210 outputs the generated electric signal toward the SerDes 220.

The wavelength-tunable optical transceiver 210 has an optical transmitter of, for example, a wavelength-tunable laser. The wavelength-tunable optical transceiver 210 converts an electric signal fed from the SerDes 220 to an upstream optical signal having the upstream wavelength λU1 and outputs the converted upstream optical signal toward the OLT 10.

The distributor 261 duplicates the electric signal output from the wavelength-tunable optical transceiver 210, feeds one of the two electric signals to the SerDes 220, and feeds the other electric signal to the controller 250. It should be noted that, if the electric signal sent from the wavelength-tunable optical transceiver 210 for the SerDes 220 is a differential signal, the electric signals sent from the distributor 261 to the SerDes 220 and the controller 250 are also differential signals.

The SerDes 220 extracts a clock from the electric signal fed from the wavelength-tunable optical transceiver 210 and retimes the electric signal with the extracted clock to convert the electric signal into parallel digital signals. Then, the SerDes 220 outputs the converted digital signals toward the PHY/MAC processor 230.

The SerDes 220 also converts parallel digital signals fed from the PHY/MAC processor 230 into a serial electric signal with a clock signal in parallel with the digital signals. The SerDes 220 then outputs the converted electric signal toward the wavelength-tunable optical transceiver 210.

The distributor 262 duplicates the parallel digital signals output from the SerDes 220 and a clock signal in parallel with the digital signals, inputs one of the two sets of signals to the PHY/MAC processor 230, and inputs the other set to the controller 250.

The PHY/MAC processor 230 decodes the digital signals fed from the SerDes 220 via the distributor 262 and the error correction code in accordance with the protocol (optical access standard) employed by the ONU 20 including the PHY/MAC processor 230. Furthermore, the PHY/MAC processor 230 separates the frame of the received digital signal into a user data frame and a control frame, transfers the user data frame to the UNI processor 240, and performs processing appropriate for the type of the control frame on the control frame.

The PHY/MAC processor 230 also analyzes the header of a frame received from the UNI processor 240 and stores the frame to a queue held by the PHY/MAC processor 230. Thereafter, in response to a permission of upstream transmission, the PHY/MAC processor 230 retrieves the frame from the queue and encodes the digital signal of the retrieved frame. At this phase, the PHY/MAC processor 230 performs FEC encoding depending on the employed standard. The PHY/MAC processor 230 outputs digital signals of the encoded data and a clock signal in parallel thereto toward the SerDes 220.

The UNI processor 240 converts a user data frame received from the PHY/MAC processor 230 into signals conformable to the UNI (User Network Interface) and sends the obtained frame to the terminal 5. The UNI processor 240 also transfers a user data frame received from the terminal 5 to the PHY/MAC processor 230.

The controller 250 presumes the protocol (optical access standard) of a downstream optical signal based on the downstream electric signal fed from the distributor 261, the digital signal fed from the distributor 262, and the control signal fed from the PHY/MAC processor 230.

Then, the controller 250 determines whether the presumed protocol matches the protocol (optical access standard) of the ONU 20 including the controller 250. The controller 250 instructs the wavelength-tunable optical transceiver 210 to set an upstream wavelength and a downstream wavelength or to turn on or off the output the optical transmitter (laser). Detailed processing of the controller 250 will be described later.

Figure 4:
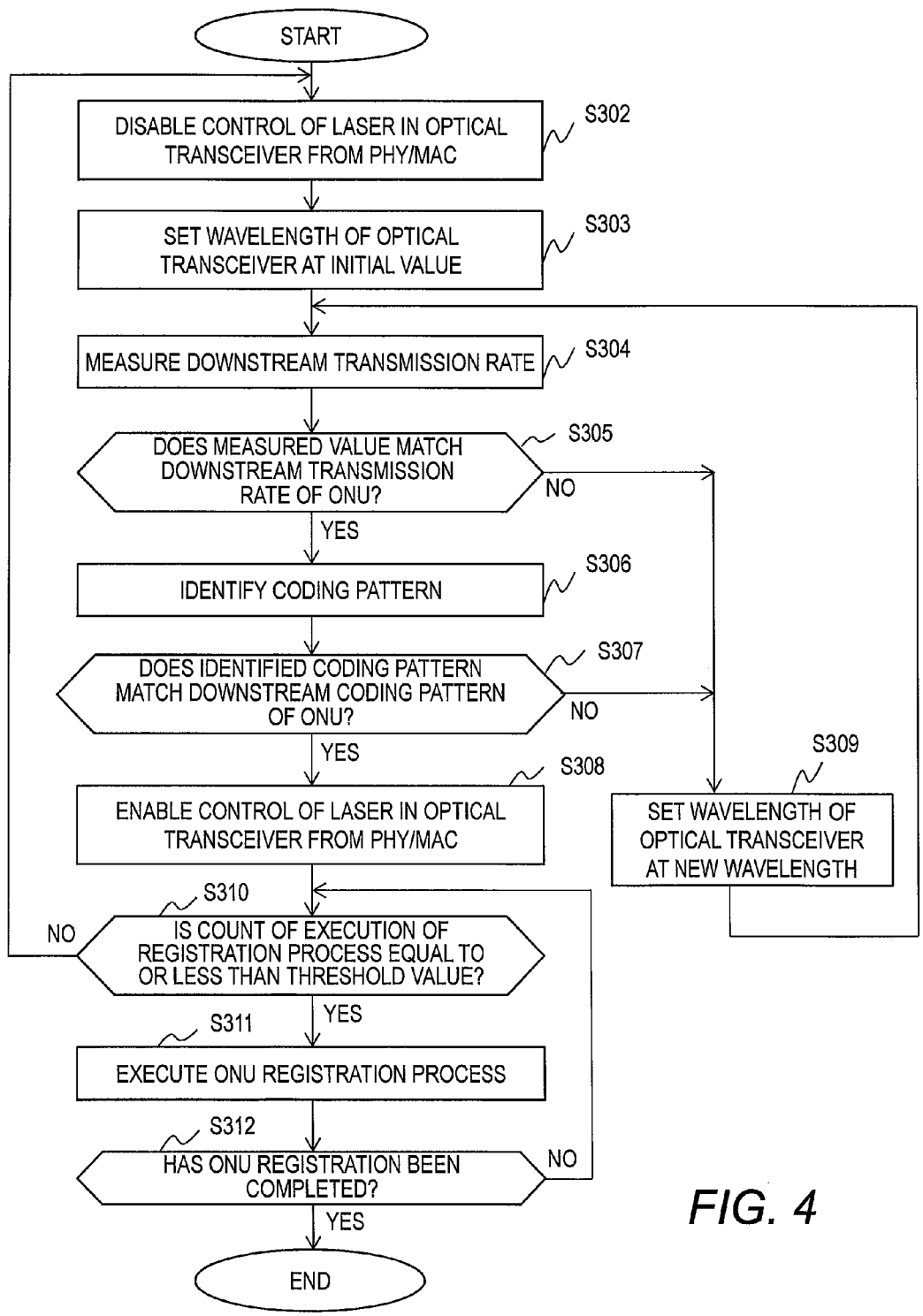
FIG. 4 is a flowchart illustrating processing of a controller of an ONU in Embodiment 1.

FIG. 4 is a flowchart illustrating processing of the controller 250 of an ONU 20 in Embodiment 1.

The controller 250 of an ONU 20 starts the processing illustrated in FIG. 4 upon start of the ONU 20. The controller 250 first disables the operation of the PHY/MAC processor 230 to turn on or off the optical transmitter (laser) in the wavelength-tunable optical transceiver 210 (S302). As a result, only the controller 250 can turn on or off the laser emission of the wavelength-tunable optical transceiver 210.

The controller 250 performs S302 to keep the laser emission off until detection of a wavelength matching the protocol of the ONU 20 including the controller 250. As a result, the controller 250 prevents adverse effects on communications of other ONUs 20, such as wrong emission of light at a wavelength used by other ONUs 20 which are already receiving service.

After S302, the controller 250 sets the upstream wavelength λU and downstream wavelength λD of the wavelength-tunable optical transceiver 210 at initial values held by the controller 250 (S303). The initial values may be one of a plurality of patterns of wavelengths (for example, λ1 to λ4) to be used in the optical access network in this embodiment or randomly selected one of a plurality of patterns. Hereinafter, a wavelength λk (k is a natural number) means a combination of an upstream wavelength λuk and a downstream wavelength λdk. The wavelength λuk and the wavelength λdk may be the same or not be the same.

Thereafter, the wavelength-tunable optical transceiver 210 receives downstream optical signals having the downstream wavelength λD set at S303. The operation that the wavelength-tunable optical transceiver 210 does not receive downstream optical signals having the wavelengths other than the wavelength set to the wavelength-tunable optical transceiver 210 means that the wavelength-tunable optical transceiver 210 converts the downstream optical signals having the wavelengths other than the wavelength set to the wavelength-tunable optical transceiver 210 into electric signals having an intensity level of zero. Then, the wavelength-tunable optical transceiver 210 transfers the converted electric signals toward the SerDes 220. Hence, the controller 250 receives the converted electric signals having an intensity level of zero, so that it can measure the downstream transmission rate at later-described S304.

After S303, the controller 250 determines the downstream transmission rate of the electric signal received from the distributor 261 as a property of the downstream optical signal. To determine the downstream transmission rate, the controller 250 monitors the downstream transmission rate for a period predetermined for downstream transmission rate measurement. Although the method to measure the downstream transmission rate is not specifically limited, an example is described as follows.

For example, the controller 250 may monitor the frequency spectrum of electric signals input for a predetermined period and measure the downstream transmission rate with a frequency with a specific intensity level. Alternatively, the controller 250 may determine the frequency at which the frequency spectrum of the electric signals shows the highest intensity to measure the downstream transmission rate (S304).

If electric signals having an intensity level of zero are continuously received in the predetermined period, the controller 250 determines the downstream transmission rate to be a value of zero at S304.

After S304, the controller 250 determines whether the measured downstream transmission rate matches the downstream transmission rate conformable to the protocol for the ONU 20 including the controller 250 (S305). The controller 250 holds in advance a numerical value indicating the downstream transmission rate or other information on the protocol installed in the ONU 20.

Alternatively, the controller 250 may determine that the measured downstream transmission rate matches the downstream transmission rate of the protocol in the ONU 20 if they are in a relation satisfying predetermined conditions. For example, if the difference between the measured downstream transmission rate and the downstream transmission rate of the protocol in the ONU 20 is equal to or less than a predetermined threshold value, the controller 250 may determines that the downstream transmission rate matches the protocol; if the difference is more than the threshold, the controller 250 may determine that the downstream transmission rate does not match the protocol.

In the case where the downstream transmission rate is a zero value, the controller 250 determines that the measured downstream transmission rate does not match the downstream transmission rate conformable to the protocol.

If the determination at S305 is that the measured downstream transmission rate matches the downstream transmission rate conformable to the protocol, the controller 250 proceeds to S306; if the determination at S305 is a mismatch, the controller 250 proceeds to S309.

At S306, the controller identifies the coding pattern of the downstream digital signal received from the distributor 262 as a property of the downstream optical signal. For example, the controller 250 identifies whether the received digital signal has a 10G-EPON coding pattern or a 10G-P2P coding pattern. A specific method to identify the coding pattern will be described later.

The controller 250 holds in advance an identifier, a numerical value, or the like representing the coding pattern of the protocol installed in the ONU 20.

After S306, the controller 250 determines whether the coding pattern identified at S306 matches the coding pattern of the protocol preinstalled in the ONU 20 (S307). The controller proceeds to S308 in the case of a match and proceeds to S309 in the case of a mismatch.

At S309, the controller 250 determines that the wavelength-tunable optical transceiver 210 should not send and receive signals having the wavelength set to the wavelength-tunable optical transceiver 210 using the protocol installed in the ONU 20 and changes the wavelength of the wavelength-tunable optical transceiver 210 to a new wavelength. The controller 250 may change the wavelength to any wavelength as far as it is a wavelength other than the wavelength already set to the wavelength-tunable optical transceiver 210 at S304. For example, the controller 250 subtracts one from the number of the wavelength identifier assigned to the wavelength in advance to select a new wavelength; alternatively, it adds one to the number of the wavelength identifier to select a new wavelength.

After S309, the controller 250 returns to S304.

At S308, the controller 250 enables the operation of the PHY/MAC processor 230 to turn on or off the laser in the wavelength-tunable optical transceiver 210. As a result, the laser in the wavelength-tunable optical transceiver 210 is not controlled by the controller 250 but is controlled by the PHY/MAC processor 230.

After S308, the controller 250 determines whether the count of execution of a registration process at S311 to register the ONU 20 is equal to or less than a predetermined threshold value (S310). If the count is equal to or less than the threshold value, the controller 250 proceeds to S311 and if the count is more than the threshold value, the controller 250 returns to S302.

At S311, the controller 250 executes a registration process to register the ONU 20 in the OLT 10. Specifically, the registration process includes measuring a distance between the OLT 10 and the ONU 20 and assigning a logical link identifier from the OLT 10 to the ONU 20. The registration process is performed in accordance with the protocol preinstalled in the ONU 20.

At S312, the controller 250 determines whether the registration process executed at S311 has been completed. If the registration process has been completed, the controller 250 terminates the processing illustrated in FIG. 4; if the registration process has not been completed, the controller 250 returns to S310.

Through the flowchart in FIG. 4, an unregistered ONU 20 in this embodiment determines whether the properties of the received downstream optical signal match its own protocol based on the transmission rate and the coding pattern of the downstream optical signal; in the case of a mismatch, it changes the wavelength for downstream optical signals to receive; and in the case of a match, it executes a registration process in accordance with its own protocol. As a result, the ONU 20 in this embodiment can determine the wavelength for downstream optical signals to receive in accordance with its own protocol.

It should be noted that, if the ONU 20 wrongly determines that the transmission rate and the coding pattern match its protocol, the ONU 20 will fail in the registration process and repeats S310 to S312. After repeating S310 to S312 for a predetermined number of times, the controller 250 returns to S302 to be allowed to perform the processing shown in FIG. 4 again from the beginning.

If the protocols used in the optical access network in this embodiment are two protocols (for example, 10G-EPON and 1G-EPON) differing only in transmission rate, the controller 250 may omit S306 and S307.

Figure 5A:
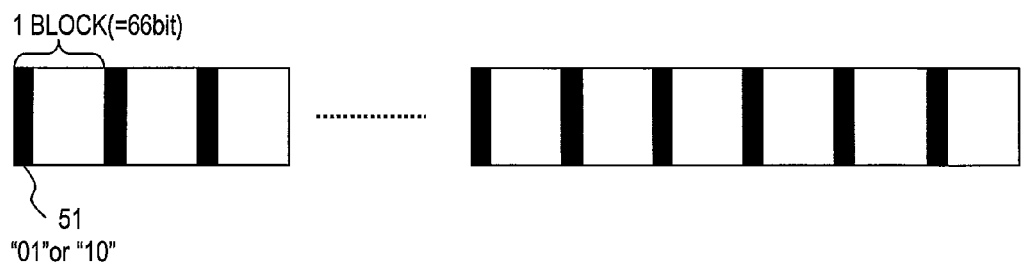
FIG. 5A is a diagram illustrating a method of identifying a coding pattern in Embodiment 1.
Figure 5B:
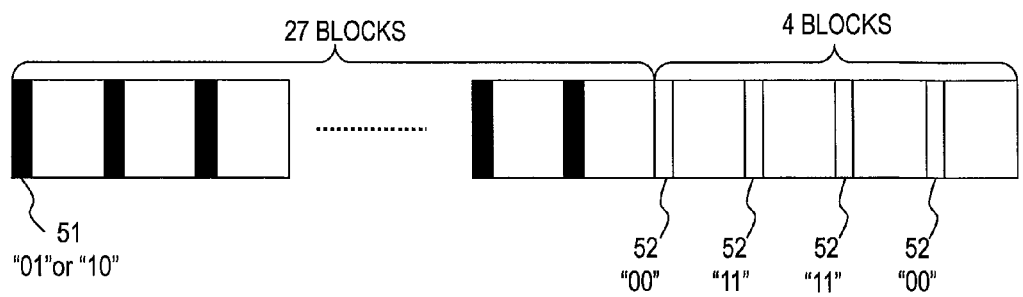
FIG. 5B is a diagram illustrating a method of identifying the coding pattern in Embodiment 1.

FIGS. 5A and 5B are explanatory diagrams illustrating a method of identifying the coding pattern in Embodiment 1.

In this description, a difference in coding pattern between the 10G-P2P protocol and the 10G-EPON protocol is described and further, a method to detect the difference is described.

FIG. 5A is an explanatory diagram illustrating the coding pattern of a downstream optical signal in 10G-P2P in Embodiment 1.

FIG. 5B is an explanatory diagram illustrating the coding pattern of a downstream optical signal in 10G-EPON in Embodiment 1.

The signal using the 10G-P2P protocol is processed with 64B/66B encoding and no error correction code is attached. On the other hand, the signal using the 10G-EPON protocol is processed with 64B/66B encoding and an error correction code (FEC code) using Reed Solomon (255, 223) is attached.

In the 64B/66B encoding, 2 bits of synchronous bits 51, "10" or "01", are attached to 64-bit data. Accordingly, a 64B/66B encoded signal shows a coding pattern of "10" or "01" at each cycle of one block (66 bits).

In 10G-EPON, in addition to the 64B/66B encoding, an error correction code of FEC parities 52 using FEC codes are attached to the signal. Specifically, four blocks with FEC parities 52 are attached to 27 blocks of data (one block consists of 66 bits).

Accordingly, FEC parities 52 of "00", "11", "11", and "00" follow 27 synchronous bits 51 of "10" or "01" as shown in FIGS. 5A and 5B.

The controller 250 therefore can detect the difference in coding pattern by extracting signals at a 31-block cycle to attain identification of the protocol, 10G-P2P or 10G-EPON.

Figure 6:
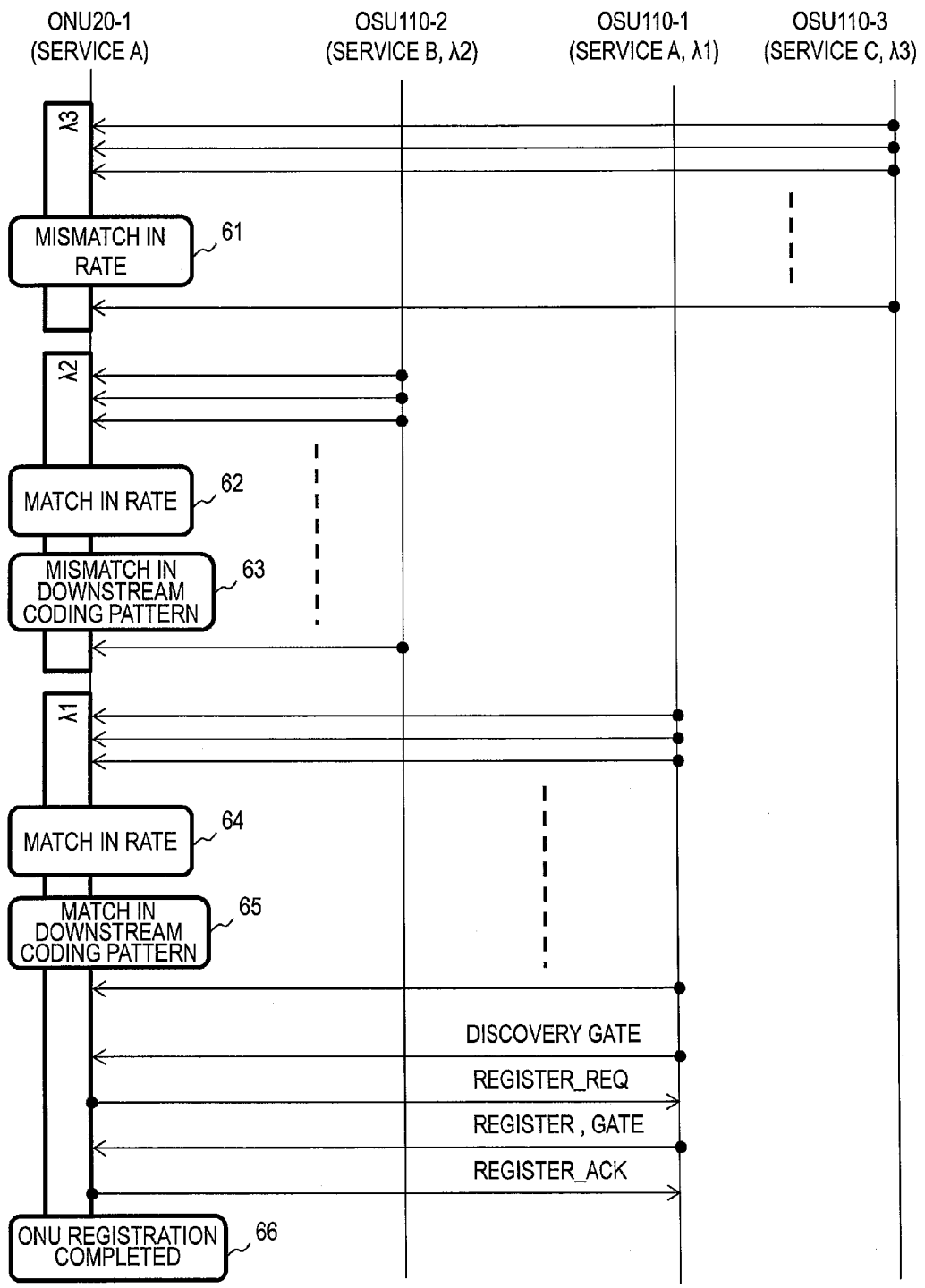
FIG. 6 is a sequence diagram illustrating processing in response to the first connection of an ONU in Embodiment 1 with an OLT.

FIG. 6 is a sequence diagram illustrating processing in response to the first connection of an ONU 20 in Embodiment 1 with an OLT 10.

The processing illustrated in FIG. 6 includes processing to determine the wavelength to be used in the wavelength-tunable optical transceiver 210 and discovery processing.

For simplicity of description, FIG. 6 illustrates a sequence in an optical access network including one ONU 20-1 and one OLT 10. The OLT 10 in FIG. 6 includes three OSUs 110 (OSUs 110-1 to 110-3).

The ONU 20-1 is an ONU 20 for Service A, and is configured in advance to send and receive signals with 10G-EPON. The OSU 110-1 is an OSU 110 for Service A, and sends and receives signals having a wavelength λ1 by 10G-EPON. The OSU 110-2 is an OSU 110 for Service B, and sends and receives signals having a wavelength λ2 with 10G-P2P. The OSU 110-3 is an OSU 110 for Service C, and sends and receives signals having a wavelength λ3 with 1G-EPON. At the start of the sequence shown in FIG. 6, the ONU 20-1 has not been registered in the OLT 10.

First, the ONU 20-1 is newly connected with the OLT 10 via an optical splitter 32 and others; after execution of S302 in FIG. 4, the controller 250 of the ONU 20-1 shown in FIG. 6 sets the initial value for the wavelength of the signals to be sent and received by the wavelength-tunable optical transceiver 210 of the same ONU 20-1 at a wavelength λ3 (upstream wavelength λu3, downstream wavelength λd3) (S303). The wavelength-tunable optical transceiver 210 of the ONU 20-1 receives only the downstream optical signal having the wavelength λd3 sent from the OSU 110-3. The controller 250 monitors the transmission rate of the downstream signal based on the electric signal fed from the distributor 261 for a predetermined period to measure the downstream transmission rate (S304). At this phase, the measured transmission rate is 1 Gbps.

Since the measured transmission rate (1 Gbps) does not match the downstream transmission rate of 10 Gbps in the protocol installed in the ONU 20-1 (61), the controller 250 makes the wavelength-tunable optical transceiver 210 change the upstream wavelength and the downstream wavelength. In this case, the controller 250 issues an instruction to change the wavelength λ3 into a wavelength λ2 to the wavelength-tunable optical transceiver 210, so that the wavelength of the wavelength-tunable optical transceiver 210 is changed to the wavelength λ2 (upstream wavelength λu2, downstream wavelength λd2) after a certain time to change the wavelength.

Subsequently, the wavelength-tunable optical transceiver 210 in the ONU 20-1 receives only the downstream signal having the wavelength λd2 sent from the OSU 110-2. The controller 250 then monitors the downstream signal transmission rate based on the electric signal fed from the distributor 261 for a predetermined time to measure the downstream transmission rate (S304). At this phase, the measured transmission rate is 10 Gbps.

Since the measured transmission rate (10 Gbps) matches the downstream transmission rate of 10 Gbps in the protocol installed in the ONU 20-1 (62), the controller 250 identifies the coding pattern of the downstream signal based on the digital signal fed from the distributor 262 (S306). The identified coding pattern is 64B/66B, which does not match the coding pattern of 64B/66B+FEC, which is the coding pattern of the protocol installed in the ONU 20-1 (S307: 63).

Accordingly, the controller 250 makes the wavelength-tunable optical transceiver 210 change the upstream wavelength and the downstream wavelength. In this case, the controller 250 issues an instruction to change the wavelength λ2 to a wavelength λ1 to the wavelength-tunable optical transceiver 210, so that the wavelength of the wavelength-tunable optical transceiver 210 is changed to the wavelength λ1 (upstream wavelength λu1, downstream wavelength λd1) after a certain time to change the wavelength.

Subsequently, the wavelength-tunable optical transceiver 210 of the ONU 20-1 receives only the downstream optical signal having the wavelength λd1 sent from the OSU 110-1. The controller 250 then monitors the downstream signal transmission rate based on the electric signal fed from the distributor 261 for a predetermined period to measure the downstream transmission rate (S304). At this phase, the measured transmission rate is 10 Gbps.

Since the measured downstream transmission rate (10 Gbps) matches the downstream transmission rate of 10 Gbps in the protocol installed in the ONU 20-1 (64), the controller 250 identifies the coding pattern of the downstream signal based on the digital signal fed from the distributor 262 (S306). The identified coding pattern is 64B/66B+FEC, which matches the coding pattern of the protocol installed in the ONU 20-1, 64B/66B+FEC (65).

Accordingly, the controller 250 issues an instruction to the wavelength-tunable optical transceiver 210 to fix the upstream wavelength and the downstream wavelength at the upstream wavelength λu1 and the downstream wavelength λd1 for a predetermined period until the ONU 20-1 is registered in the OLT 1. After the controller 250 executes S308, the ONU 20 starts a registration process (S310 to S312).

Specifically, after receipt of a Discovery GATE frame from the OSU 110-1, the ONU 20-1 executes a discovery process in accordance with 10G-EPON. Specifically, the ONU 20-1 waits for a random period since the time designated by the Discovery GATE frame and then sends a Register_Req frame representing a request for registration to the OSU 110-1.

Upon receipt of the Register_Req frame, the OSU 110-1 sends a Register frame and a GATE frame to the ONU 20-1. The ONU 20-1 sends a Register_Ack frame to the OSU 110-1 at the time designated by the GATE frame. When the OSU 110-1 receives the Register_Ack frame, the registration process for the ONU-20-1 is completed.

Through the above-described processing, an ONU 20 in this embodiment that has been first connected with the OLT 10 can automatically determine the wavelength for the signals to send and receive using the protocol installed in the ONU 20 and automatically perform registration of the ONU 20.

According to Embodiment 1, in a wavelength-division multiplexing optical access network employing a plurality of protocols together, an unregistered ONU 20 determines whether the properties (transmission rate and coding pattern) of the downstream optical signal match or conform to the protocol installed in the ONU 20 and repeats changing the wavelength of the ONU 20 until it matches or conforms to the protocol.

Hence, the ONU 20 can automatically determine the wavelength for the signals to send and receive using the installed protocol only from the downstream optical signal. In registering the ONU 20 in the OLT 10, there is no need to manually change the configuration of the ONU 20, achieving low maintenance operation cost.

Even if the association relation between the protocol and the wavelength is changed in the OSU 110, the ONU 20 does not need to manually change its configuration since the ONU 20 automatically determines the wavelength. As a result, low maintenance operation cost is achieved.

Embodiment 2

In Embodiment 1, the protocol is identified based on the properties of the downstream optical signal. However, only the properties presumed from the downstream optical signal may not be able to accurately identify the protocol. If the protocol has been identified wrongly, the ONU 20 wastes execution of the registration process. In view of this problem, Embodiment 2 attains accurate identification of the protocol even in the case where only the properties presumed from a downstream optical signal cannot accurately identify the protocol.

The configurations of an OLT 10 and ONUs 20 in Embodiment 2 are the same as those of the OLT 10 and the ONUs 20 in Embodiment 1 and the other apparatuses are the same in Embodiments 1 and 2.

However, the Discovery GATE frame in Embodiment 2 includes a field for indicating the protocol type. The ONU 20 in Embodiment 2 identifies the protocol based on the received Discovery GATE frame. For this reason, the processing described hereinafter is mainly processing of an ONU 20 to receive a Discovery GATE frame.

Figure 7:
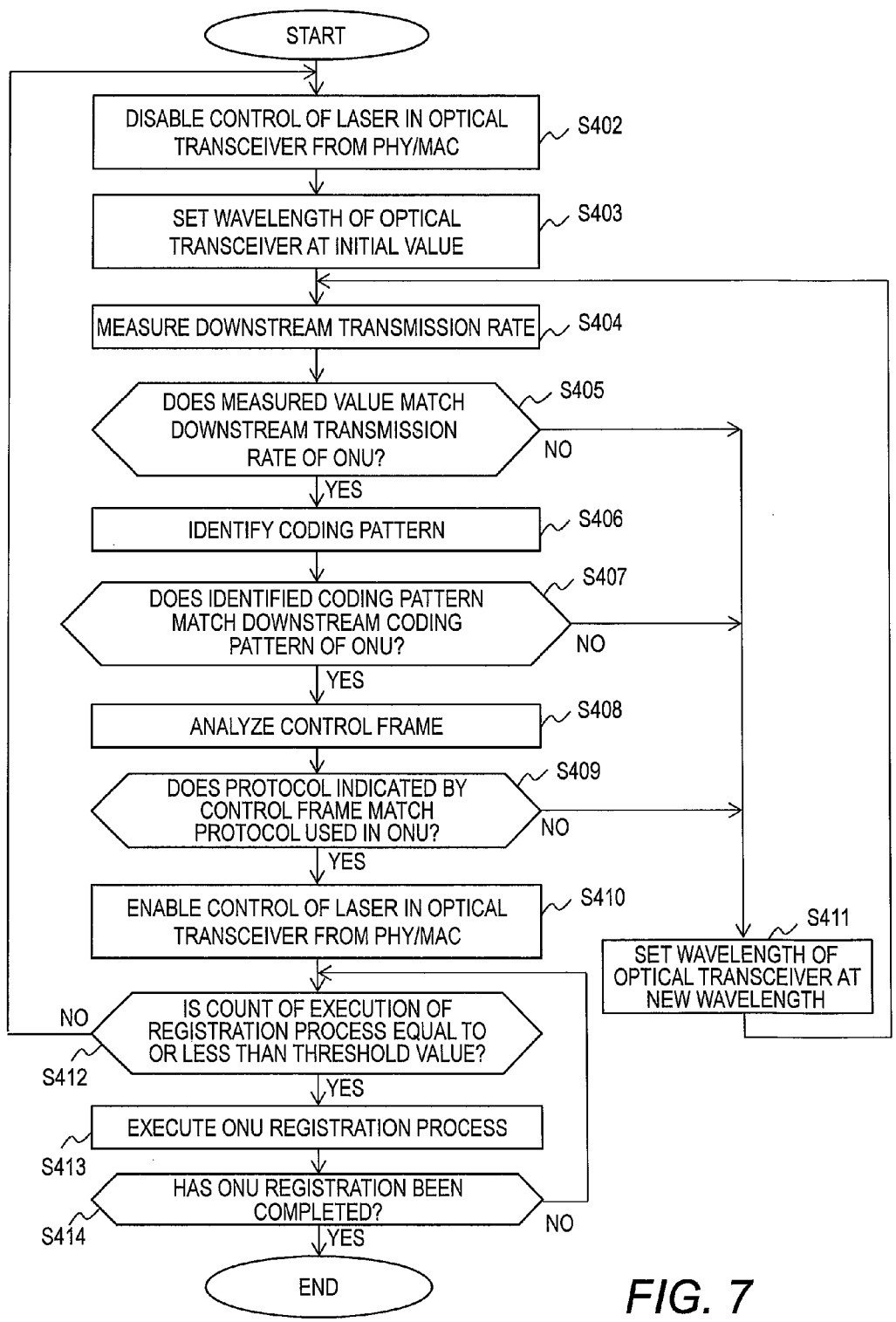
FIG. 7 is a flowchart illustrating processing of a controller of an ONU in Embodiment 2.

FIG. 7 is a flowchart illustrating processing of the controller 250 of an ONU 20 in Embodiment 2.

In this description, differences from Embodiment 1 are mainly described.

The controller 250 in Embodiment 2 executes S402 to S404 upon start of the ONU 20. S402 is the same as S302 in Embodiment 1; S403 is the same as S303 in Embodiment 1; and S404 is the same as S304 in Embodiment 1.

After S404, the controller 250 determines whether the measured downstream transmission rate matches the downstream transmission rate in the protocol installed in the ONU 20 including the controller 250 (S405). In the case of a match in downstream transmission rate, the controller 250 proceeds to S406; in the case of a mismatch in downstream transmission rate, the controller proceeds to S411.

S406 is the same as S306 in Embodiment 1.

After S406, the controller 250 determines whether the coding pattern identified at S406 matches the coding pattern of the protocol installed in the ONU 20 (S407), like S307 in Embodiment 1. In the case of a match in coding pattern, the controller 250 proceeds to S408; in the case of a mismatch in coding pattern, it proceeds to S411.

At S408, the controller 250 analyzes the signal (Discovery GATE frame) fed from the distributor 262. Specifically, the controller 250 analyzes the signal fed from the distributor 262 with the coding pattern identified at S406 to identify the value indicating the protocol in the received signal as a property of the downstream optical signal.

The controller 250 determines at S408 whether the received signal is a Discovery GATE frame and, if it is a Discovery GATE frame, it identifies the value indicating the protocol. If the received downstream optical signal is not a Discovery GATE control frame, the controller 250 cannot identify the value indicating the protocol at S408; accordingly, the controller 250 determines at S409 that the protocol indicated by the downstream optical signal does not match the protocol installed in the ONU 20.

After S408, the controller 250 compares the protocol type identified at S408 with the protocol type installed in the ONU 20 (information on which is held in advance) to determine whether the protocol indicated by the downstream optical signal matches the protocol installed in the ONU 20 (S409). In the case of a match, the controller proceeds to S410; in the case of a mismatch, it proceeds to S411.

S411 is the same as S309 in Embodiment 1. S410 is the same as S308 in Embodiment 1; S412 is the same as S310; S413 is the same as S311 in Embodiment 1; and S414 is the same as S312 in Embodiment 1.

Through the processing illustrated in FIG. 7, an unregistered ONU 20 identifies the protocol based on the transmission rate and the coding pattern of a downstream optical signal, and further determines whether the protocol indicated by a downstream control frame matches its own protocol. In the case of a mismatch, it changes the wavelength into a new one; in the case of a match, it performs a registration process in accordance with the protocol installed in the ONU 20. Since the ONU 20 in Embodiment 2 can identify the protocol of the downstream optical signal more accurately, it can determine a wavelength to be used in the ONU 20 without wasting execution of a registration process.

Figure 8:
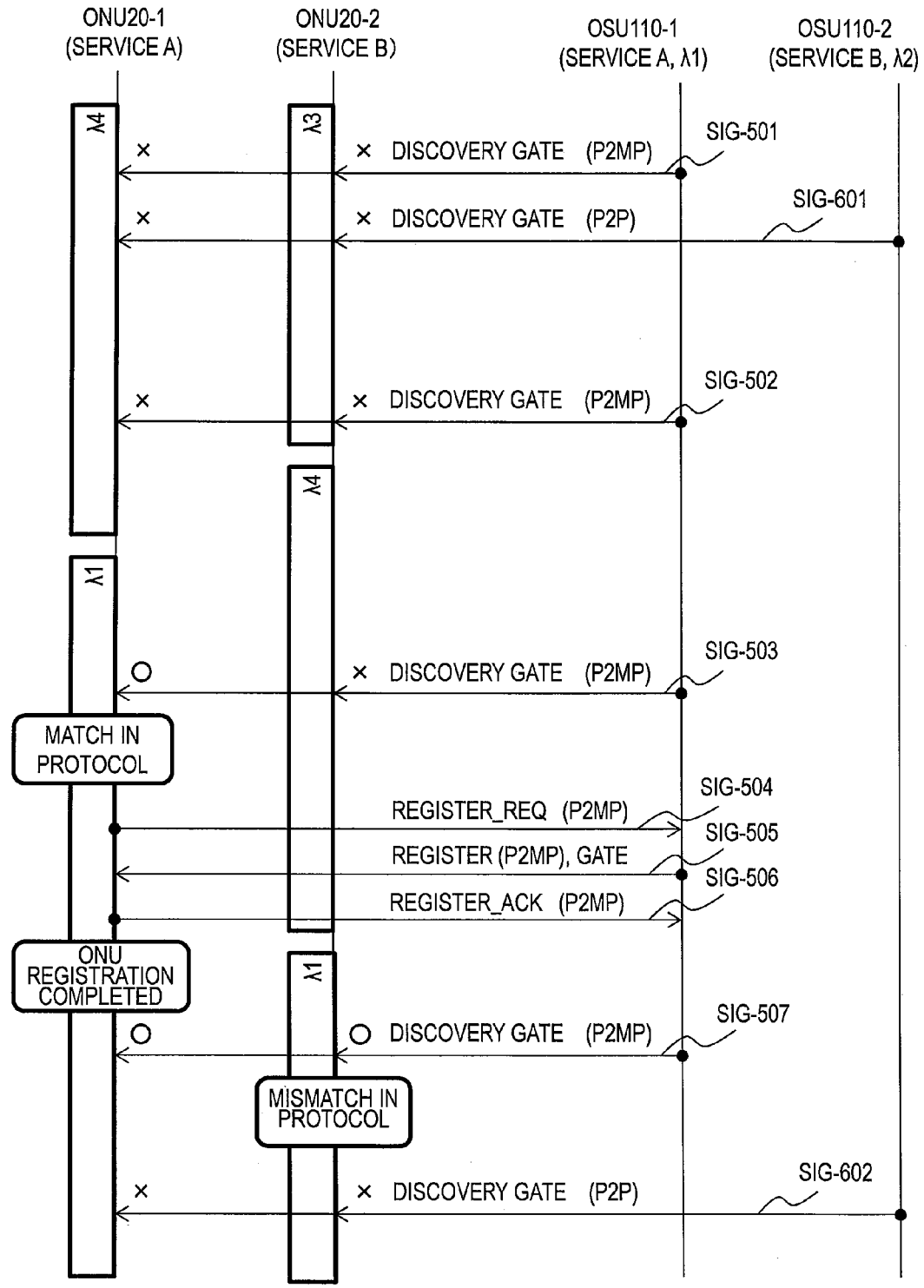
FIG. 8 is a sequence diagram illustrating processing in response to the first connection of ONUs in Embodiment 2 with an OLT.

FIG. 8 is a sequence diagram illustrating processing in response to the first connection of ONUs 20 in Embodiment 2 with an OLT 10.

The processing illustrated in FIG. 8 includes processing to determine the wavelength to be used in the wavelength-tunable optical transceiver 210 and discovery processing.

For simplicity of description, FIG. 8 illustrates a sequence in an optical access network including two ONUs 20 (ONUs 20-1 and 20-2) and one OLT 10. The OLT 10 in FIG. 8 includes two OSUs 110 (OSUs 110-1 and 110-2).

The ONU 20-1 is an ONU 20 for Service A, and sends and receives signals using a P2MP protocol. The ONU 20-2 is an ONU 20 for Service B, and sends and receives signals using a P2MP protocol.

The OSU 110-1 is an OSU 110 for Service A, and sends and receives signals having a wavelength λ1 using a P2MP protocol. The OSU 110-2 is an OSU 110 for Service B, and sends and receives signals having a wavelength λ2 using a P2P protocol. At the start of the sequence shown in FIG. 8, the ONUs 20-1 and 20-2 are unregistered. The OSUs 110-1 and 110-2 execute discovery processing with different timings or in different cycles.

First, it is assumed that the ONU 20-1 and the ONU 20-2 are newly connected with the OLT 10 via an optical splitter 32 and others and their wavelengths are set at a wavelength λ4 to the ONU 20-1 and at a wavelength λ3 to the ONU 20-2.

The OSU 110-1 sends Discovery GATE frames (P2MP) (SIG-501, SIG-502). However, neither the ONUs 20-1 nor 20-2 receive the Discovery GATE frames (P2MP) sent from the OSU 110-1 because the wavelength of the Discovery GATE frames do not match the wavelengths set to their wavelength-tunable optical transceivers 210.

In the meanwhile, the OSU 110-2 sends a Discovery GATE frame (P2P) (SIG-601). However, neither the ONUs 20-1 nor 20-2 receive the Discovery GATE frame (P2P) sent from the OSU 110-2 because the wavelength of the Discovery GATE frame (P2P) does not match the wavelengths set to their wavelength-tunable optical transceivers 210.

Each of the ONUs 20-1 and 20-2 sets a new wavelength for the signals to send and receive to its wavelength-tunable optical transceiver 210 if the downstream transmission rate set to the ONU 20 does not match the measured downstream transmission rate for a predetermined time to measure the downstream transmission rate (S411).

The controller 250 of the ONU 20-1 in FIG. 8 sets a new wavelength λ1 to the wavelength-tunable optical transceiver 210. The controller 250 of the ONU 20-2 in FIG. 8 also sets a new wavelength λ4 to the wavelength-tunable optical transceiver 210. It should be noted that, since the predetermined time to measure the downstream transmission rate may be different in each ONU 20, the timing to set a new wavelength may be different in each ONU 20.

Subsequently, the OSU 110-1 sends a Discovery GATE frame (P2MP) (SIG-503). The ONU 20-2 does not receive the Discovery GATE frame (P2MP) because the wavelength of the Discovery GATE frame (P2MP) sent at SIG-503 does not match the wavelength set to the wavelength-tunable optical transceiver 210.

However, the ONU 20-1 receives the Discovery GATE frame (P2MP) because the wavelength of the P2MP Discovery GATE frame sent at SIG-503 matches the wavelength set to the wavelength-tunable optical transceiver 210.

The controller 250 of the ONU 20-1 executes S406 to S409 on the received Discovery GATE frame (P2MP). At this phase, it is determined at S407 that the coding pattern of the Discovery GATE frame (P2MP) sent at SIG-503 matches the coding pattern set to the ONU 20-1 and determined at S409 that the value indicating the protocol extracted at S408 matches the protocol installed in the ONU 20-1.

In this situation, the ONU 20-1 executes the registration process in accordance with its protocol (corresponding to S412 to S414). Specifically, the controller 250 of the OSU 20-1 makes the wavelength-tunable optical transceiver 210 to send a Register_Req frame toward the OLT 10 at the time designated by the Discovery GATE frame (SIG-504). Upon receipt of the Register_Req frame, the OLT 10 sends a Register frame and a GATE frame toward the ONU 20-1 (SIG-505). Upon receipt of the Register frame and the GATE frames, the controller 250 of the ONU 20-1 makes the wavelength-tunable optical transceiver 210 send a Register_Ack frame toward the OLT 10 as a response (SIG-506).

Through the above-described processing, the determination of the wavelength and the registration process of the ONU 20-1 are completed.

On the other hand, the controller 250 of the ONU 20-2 sets a new wavelength λ1 to the wavelength-tunable optical transceiver 210 after the predetermined time to measure the downstream transmission rate.

Subsequently, the OSU 110-1 sends a Discovery GATE frame (P2MP) (SIG-507). The ONUs 20-1 and 20-2 receive the Discovery GATE frame (P2MP) because the wavelength of the Discovery GATE frame (P2MP) sent at SIG-507 match the wavelength set to their wavelength-tunable optical transceivers 210.

Since the ONU 20-1 has already been registered, it does not respond to the OLT 10 even though it receives the Discovery GATE frame. The ONU 20-2 executes S406 to S409 in response to the Discovery GATE frame (P2MP) sent at SIG-507. At this phase, it is determined at S407 that the coding pattern of the Discovery GATE frame (P2MP) sent at SIG-507 matches the coding pattern set to the ONU 20-2 and determined at S409 that the value indicating the protocol extracted at S408 does not match the protocol installed in the ONU 20-2. Accordingly, the ONU 20-2 does not execute the registration process.

In the meanwhile, the OSU 110-2 sends a Discovery GATE frame (P2P) having a wavelength λ2 (SIG-602). However, neither the ONUs 20-1 nor 20-2 receive the Discovery GATE frame (P2P) sent from the OSU 110-2 at SIG-602 because the wavelength of the Discovery GATE frame (P2P) does not match the wavelengths set to their wavelength-tunable optical transceivers 210.

Through the processing illustrated in FIGS. 7 and 8, the controller 250 of an unregistered ONU 20 changes the wavelength periodically (in every period to measure the downstream transmission rate) and extracts a value indicating the protocol included in a Discovery GATE frame as a property of the downstream optical signal. If the protocol indicated by the extracted value matches the protocol installed in the ONU 20, the controller 250 executes a registration process. Such processing allows the ONU 20 to accurately identify the protocol of the received frame; accordingly, the ONU 20 can properly determine a wavelength appropriate for its protocol, preventing useless execution of the registration process.

In the foregoing Embodiments 1 and 2, the downstream transmission rate, the coding pattern, and the identifier indicating the protocol are used as the properties of a downstream optical signal to be used to identify the protocol; however, the properties of a downstream optical signal are not limited to these. For example, the controller 250 may determine whether a downstream control frame has been received for a property of the downstream optical signal.

The method to identify the protocol depending on whether a downstream control frame has been received is effective to accurately identify the protocol in the case where a plurality of protocols used in an optical access network have the same transmission data rate and employ the same coding pattern (for example, in the case of 1 G-P2P and 1G-EPON).

This is because the communications between an OLT 10 and an ONU 20 using 1G-P2P are one-to-one communications and no MPCP control frame is sent and received in the system using 1G-P2P. In contrast, the communications between an OLT 10 and an ONU 20 using 1G-EPON are one-to-many communications; MPCP control frames are sent and received in the system employing 1G-EPON.

The GATE frame, which is one of the MPCP control frames, is periodically sent downstream, from an OLT 10 toward ONUs 20. For this reason, each controller 250 having information indicating the protocol for receiving downstream control frames may perform the following processing instead of the processing subsequent to S307 or the processing of S408 and S409.

After it is determined at S307 or S407 that the identified coding pattern matches the coding pattern of the protocol installed in the ONU 20, the controller 250 may determine whether a GATE frame is received during a predetermined period for sending a GATE frame. In the case of determination that that a GATE frame is received during the predetermined period, the controller 250 may determine that the property of the downstream optical signal conforms to 1G-EPON in accordance with the information indicating the protocol for receiving downstream control frames. If the identified protocol and the protocol installed in the ONU 20 are 1G-EPON, the controller 250 can determine the wavelength properly.

In this way, determination whether a downstream control frame is received allows the controller 250 to properly determine the wavelength to be used.

Embodiment 2 provides accurate identification of the protocol of a downstream optical signal based on the control frame or the downstream optical control signal; an ONU 20 can determine the wavelength more properly.

Embodiment 3

In Embodiment 1 and Embodiment 2, the signal output from the wavelength-tunable optical transceiver 210 and the signal output from the SerDes 220 are duplicated by the distributor 261 and the distributor 262, respectively, and the controller 250, the SerDes 220, and the PHY/MAC processor 230 each receive one of the two signals. However, if, although the protocol of the received downstream optical signal does not match the protocol installed in the ONU 20, the signal is fed to the subsequent circuit (the SerDes 220, the PHY/MAC processor 230, the UNI processor, and the like) because of the inaccurate identification of the protocol of the received signal by controller 250, the circuits may malfunction.

The ONU 20 in Embodiment 3 has a switching function to feed the output from the wavelength-tunable optical transceiver 210 to either the SerDes 220 or its controller 251 and a switching function to feed the output from the SerDes 220 to either the PHY/MAC processor 230 or the controller 251.

Figure 9:
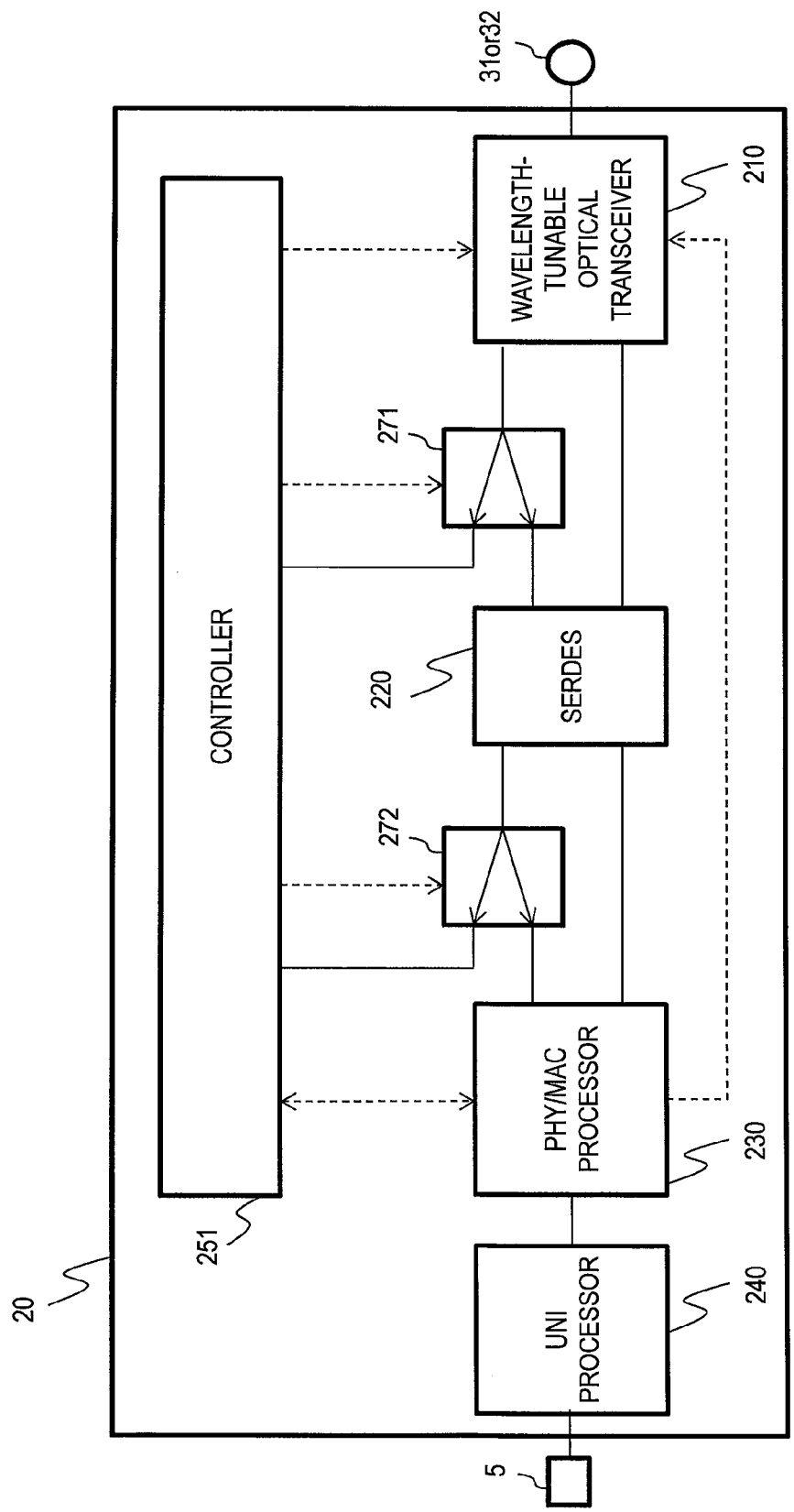
FIG. 9 is a block diagram illustrating a configuration of an ONU in Embodiment 3.

FIG. 9 is a block diagram illustrating a configuration of an ONU 20 in Embodiment 3.

The ONU 20 includes a wavelength-tunable optical transceiver 210, a SerDes 220, a PHY/MAC processor 230, a UNI processor 240, a controller 251, a switch circuit 271, and a switch circuit 272. Hereinafter, differences from Embodiments 1 and 2 are mainly described.

The wavelength-tunable optical transceiver 210 in Embodiment 3 is the same as the wavelength-tunable optical transceivers 210 in Embodiments 1 and 2. In Embodiment 3, however, the electric signal output from the wavelength-tunable optical transceiver 210 is input to the switch circuit 271.

The switch circuit 271 outputs the electric signal fed from the wavelength-tunable optical transceiver 210 to either the SerDes 220 or the controller 251. The switch circuit 271 chooses where to output the electric signal based on a control signal sent from the controller 251.

The SerDes 220 in Embodiment 3 is the same as the SerDes 220 in Embodiments 1 and 2. However, the SerDes 220 in Embodiment 3 receives the electric signal sent from the wavelength-tunable optical transceiver 210 via the switch circuit 271. The digital signals output from the SerDes 220 are fed to the switch circuit 272 in Embodiment 3.

The switch circuit 272 outputs the parallel digital signals input from the SerDes 220 and the clock signal in parallel with the digital signals to either the PHY/MAC processor 230 or the controller 251. The switch circuit 272 chooses where to output the signals based on a control signal sent from the controller 251.

The PHY/MAC processor 230 in Embodiment 3 is the same as the PHY/MAC processors 230 in Embodiments 1 and 2. However, the PHY/MAC processor 230 in Embodiment 3 receives the digital signal and other signals sent from the SerDes 220 via the switch circuit 272.

The UNI processor 240 in Embodiment 3 is the same as the UNI processors 240 in Embodiments 1 and 2.

The controller 251 in Embodiment 3 has the function of the controller 250 in Embodiment 1 or the function of the controller 250 in Embodiment 2. The controller 251 in Embodiment 3 determines whether the protocol identified from the downstream signal based on the downstream electric signal fed from the switch circuit 271 and the digital signals fed from the switch circuit 272 matches the protocol installed in the ONU 20 (corresponding to S307 or S409). Based on the result of determination, the controller 251 sets an upstream wavelength and a downstream wavelength to the wavelength-tunable optical transceiver 210 or enables the PHY/MAC processor 230 to control the laser in the wavelength-tunable optical transceiver 210.

The controller 251 also controls the switch circuits 271 and 272. Specifically, at start of the ONU 20, the controller 251 configures the switch circuits 271 and 272 so as to output the signals to the controller 251. When the controller 251 determines at S305 or S405 that the downstream transmission rate of the received downstream optical signal matches the downstream transmission rate set to the ONU 20, it sends a control signal to instruct the switch circuit 271 to switch its output to the SerDes 220.

Also, when the controller 251 determines at S307 or S407 that the identified coding pattern of the downstream optical signal matches the coding pattern of the protocol installed in the ONU 20 or when the controller 251 determines at S409 that the protocol indicated by the downstream optical signal matches the protocol installed in the ONU 20, it sends a control signal to the switch circuit 272 to instruct the switch circuit 272 to switch its output to the PHY/MAC processor 230.

The above-described configuration does not allow a downstream optical signal to enter the SerDes 220 or the PHY/MAC processor 230 unless the protocol installed in the ONU 20 matches the protocol of the received downstream optical signal but allows it to enter the subsequent circuit (the SerDes 220, the PHY/MAC processor 230, or the UNI processor 240) only in the case of a match in protocol. As a result, malfunctions in the SerDes 220, the PHY/MAC processor 230, and the like can be prevented.

In the foregoing description, an optical access network including four protocols of 10G-EPON, 10G-P2P, 1G-EPON, and 1G-P2P together has been described; however, the number and the kind of protocols are not limited to these. For example, the optical access network may include XG-PON or G-PON protocols. Also, the OSUs 110 do not need to use all different protocols; for example, the OSU 110-1 and the OSU 110-2 may use the same protocol.

The foregoing description is provided based on the frames specified by 10G-EPON; however, the OLT 10 and the ONUs 20 in the embodiments may use frames specified by a different type of TDM-PON, such as E-PON, G-PON, or XG-PON.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. As a matter of fact, it can be considered that almost of all components are interconnected.

What is claimed is:

1. A network system comprising:
   a subscriber apparatus; and
   a station-side apparatus connected with the subscriber apparatus via an optical line,
   the subscriber apparatus including a processor, memory and a transceiver,
   wherein the memory stores instructions that, when executed by the processor, cause the processor to:
      identify at least one property of a received first downstream signal, where the at least one property is at least one of a protocol, a transmission rate or a coding pattern,
      determine a first wavelength for signals to be sent and a second wavelength for signals to be received based on the identified at least one property, and
      send an instruction designating the first wavelength and the second wavelength to the transceiver, and
   wherein the transceiver is configured to:
      receive the instruction designating the first wavelength and the second wavelength from the processor,
      receive a second downstream signal sent from the station-side apparatus having the second wavelength designated by the instruction, and
      send an upstream signal having the first wavelength designated by the instruction to the station-side apparatus.

2. The network system according to claim 1,
   wherein the memory further stores instructions that, when executed by the processor, causes the processor to:
      the subscriber apparatus is not registered in the station-side apparatus, determine whether the identified at least one property conforms to a protocol preinstalled in the subscriber apparatus for the subscriber apparatus to send and receive signals,
      when a result of the determination indicates that the identified at least one property conforms to the preinstalled protocol, determine a third wavelength of the received first downstream signal having the at least one property as the first wavelength and the second wavelength for signals to be sent and received by the transceiver, and
      when the result of the determination indicates that the identified at least one property does not conform to the preinstalled protocol, send the instruction designating the first wavelength and the second wavelength to the transceiver where the first wavelength and the second wavelength are different than the third wavelength, and
   wherein the transceiver is further configured to:
      send a signal having the determined wavelength to register the subscriber apparatus in the station-side apparatus.

3. The network system according to claim 2,
   wherein the memory stores information indicating a transmission rate to send and receive signals as information on the preinstalled protocol, and
   wherein the memory further stores instructions that, when executed by the processor, causes the processor to:
      when the identified transmission rate, as the at east one property of the received first downstream signal, matches the transmission rate indicated in the information on the preinstalled protocol, determine that the identified at least one property conforms to the preinstalled protocol.

4. The network system according to claim 2,
   wherein the memory stores information indicating a coding pattern to send and receive signals as information on the preinstalled protocol, and
   wherein the memory further stores instructions that, when executed by the processor, causes the processor to:
      when the identified coding pattern, as the least one property of the received first downstream signal, matches the coding pattern indicated in the information on the preinstalled protocol, determine that the identified at least one property conforms to the preinstalled protocol.

5. The network system according to claim 2,
   wherein the memory further stores instructions that, when executed by the processor, causes the processor to:
      when the identified protocol, as the at least one property of the received first downstream signal, matches the protocol preinstalled in the subscriber apparatus, determine that the identified at least one property conforms to the preinstalled protocol.

6. The network system according to claim 2,
   wherein the memory stores information indicating a protocol of a predetermined control frame sent by the station-side apparatus in every predetermined period as information on the preinstalled protocol, and
   wherein the memory further stores instructions that, when executed by the processor, causes the processor to:
      determine whether the predetermined control frame is sent from the station-side apparatus in the predetermined period,
      identify the protocol of the predetermined control frame, as the at least one property of the received downstream signal, in accordance with a result of the determination of whether the predetermined control frame is sent and the information on the preinstalled protocol held in the controller, and
      when the identified protocol matches the protocol preinstalled in the subscriber apparatus, determine that the identified at least one property conforms to the preinstalled protocol.

7. The network system according to claim 2,
   wherein the subscriber apparatus is connected with a terminal used by a subscriber,
   wherein the subscriber apparatus further includes:
      a signal processor to transfer at least one of the received first downstream signal and the second downstream signal received from the station-side apparatus to the terminal; and
      a switching part connected with the transceiver,
   wherein, the subscriber apparatus is not registered in the station-side apparatus, the switching part transfers at least one of the received first downstream signal and the second downstream signal output by the transceiver to the processor, wherein, the identified at least one property conforms to the preinstalled protocol, the processor instructs the switching part to transfer at least one of the received first downstream signal and the second downstream signal output by the transceiver to the signal processor.

8. A subscriber apparatus connected with a station-side apparatus via an optical line, the subscriber apparatus comprising:
a transceiver to send and receive signals over the optical line; and
a processor connected to a memory,
wherein the memory stores instructions that, when executed by the processor, cause the processor to:
identify at least one property of a received first downstream signal, where the at least one property is at least one of a protocol, a transmission rate or a coding pattern,
determine a first wavelength for signals to be sent and a second wavelength for signals to be received based on the identified at least one property, and
send an instruction designating the first wavelength and the second wavelength to the transceiver, and
wherein the transceiver is configured to:
receive the instruction designating the first wavelength and the second wavelength from the processor,
receive a second downstream signal sent from the station-side apparatus having the second wavelength designated by the instruction, and
send an upstream signal having the first wavelength designated by the instruction to the station-side apparatus.

9. The subscriber apparatus according to claim 8,
wherein the memory further stores instructions that, when executed by the processor, causes the processor to:
when the subscriber apparatus is not registered in the station-side apparatus, determine whether the identified at least one property conforms to a protocol preinstalled in the subscriber apparatus for the subscriber apparatus to send and receive signals,
when a result of the determination indicates that the identified at least one property conforms to the preinstalled protocol, determine a third wavelength of the received first downstream signal having the at least one property as the first wavelength and the second wavelength for signals to be sent and received by the transceiver, and
when the result of the determination indicates that the identified at least one property does not conform to the preinstalled protocol, send the instruction designating the first wavelength and the second wavelength to the transceiver where the first wavelength and the second wavelength are different than the third wavelength, and
wherein the transceiver is further configured to:
send a signal having the determined wavelength to register the subscriber apparatus in the station-side apparatus.

10. The subscriber apparatus according to claim 9,
wherein the memory stores information indicating a transmission rate to send and receive signals as information on the preinstalled protocol,
wherein the memory further stores instructions that, when executed by the processor, causes the processor to:
when the identified transmission rate, as the at least one property of the received first downstream signal, matches the transmission rate indicated in the information on the preinstalled protocol, determine that the identified at least one property conforms to the preinstalled protocol.

11. The subscriber apparatus according to claim 9,
wherein the memory stores information indicating a coding patter to send and receive signals as information on the preinstalled protocol, and
wherein the memory further stores instructions that, when executed by the processor, causes the processor to:
when the identified coding pattern, as the at least one property of the received first downstream signal, matches the coding pattern indicated in the preinstalled protocol, determine that the identified at least one property conforms to the preinstalled protocol.

12. The subscriber apparatus according to claim 9,
wherein the memory further stores instructions that, when executed by the processor, causes the processor to:
when the identified protocol, as the at least one property of the received first downstream signal, matches the protocol preinstalled in the subscriber apparatus, determine that the identified at least one property conforms to the preinstalled protocol.

13. The subscriber apparatus according to claim 9,
wherein the memory stores information indicating a protocol of a predetermined control frame by the station-side apparatus in every predetermined period as information on the preinstalled protocol, and
wherein the memory further stores instructions that, when executed by the processor, causes the processor to:
determine whether the predetermined control frame is sent from the station-side apparatus in the predetermined period,
identify the protocol of the predetermined control frame, as the at least one property of the received downstream signal, in accordance with a result of the determination of whether the predetermined control frame is sent and the information on the preinstalled protocol held in the memory, and
when the identified protocol matches the protocol preinstalled in the subscriber apparatus, determine that the identified at least one property conforms to the preinstalled protocol.

14. The subscriber apparatus according claim 9,
wherein the subscriber apparatus is connected with a terminal used by a subscriber,
wherein the subscriber apparatus further includes:
a signal processor to transfer at least one of the received first downstream signal and the second downstream signal received from the station-side apparatus to the terminal; and
a switching part connected with the transceiver,
wherein, when the subscriber apparatus is not registered in the station-side apparatus, the switching part transfers at least one of the received first downstream signal and the second downstream signal output by the transceiver to the processor,
wherein, when the identified at least one property conforms to the preinstalled protocol, the processor instructs the switching part to transfer at least one of the received first downstream signal and the second downstream signal output by the transceiver to the signal processor.

* * * * *